(12) United States Patent
Ferris

(10) Patent No.: US 9,842,004 B2
(45) Date of Patent: Dec. 12, 2017

(54) ADJUSTING RESOURCE USAGE FOR CLOUD-BASED NETWORKS

(75) Inventor: James Michael Ferris, Cary, NC (US)

(73) Assignee: Red Hat, Inc., Raleigh, NC (US)

(*) Notice: Subject to any disclaimer, the term of this patent is extended or adjusted under 35 U.S.C. 154(b) by 1795 days.

(21) Appl. No.: 12/196,459

(22) Filed: Aug. 22, 2008

(65) Prior Publication Data

US 2010/0050172 A1    Feb. 25, 2010

(51) Int. Cl.
*G06F 9/50* (2006.01)
*G06F 9/48* (2006.01)
*G06F 9/455* (2006.01)

(52) U.S. Cl.
CPC .......... *G06F 9/5072* (2013.01); *G06F 9/4856* (2013.01); *G06F 9/50* (2013.01); *G06F 9/5027* (2013.01); *G06F 9/5044* (2013.01); *G06F 9/5077* (2013.01); *G06F 2009/4557* (2013.01); *G06F 2009/45562* (2013.01); *G06F 2009/45575* (2013.01); *G06F 2009/45591* (2013.01); *G06F 2209/503* (2013.01)

(58) Field of Classification Search
CPC .......... G06F 9/50; G06F 9/445; G06F 9/5005; G06F 9/455; G06F 9/5088; G06F 9/5072; G06F 9/5077; G06F 11/30; G06F 11/3051; G06F 11/3055; G06F 11/3065; G06F 2009/45562; G06F 2009/4557; G06F 9/5044; G06F 9/4856; G06F 9/5027; G06F 2009/45575; G06F 2009/45591; G06F 2209/503
See application file for complete search history.

(56) References Cited

U.S. PATENT DOCUMENTS

| | | | |
|---|---|---|---|
| 6,463,457 B1 | 10/2002 | Armentrout et al. | |
| 6,868,441 B2 * | 3/2005 | Greene et al. | 709/220 |
| 7,203,944 B1 * | 4/2007 | van Rietschote et al. | 718/104 |
| 7,313,796 B2 | 12/2007 | Hamilton et al. | |
| 7,380,039 B2 * | 5/2008 | Miloushev et al. | 710/244 |

(Continued)

FOREIGN PATENT DOCUMENTS

WO    WO/2007/136021    * 10/2009

OTHER PUBLICATIONS

Chase et al "Dynamic virtual clusters in a grid site manager", 2003, department of computer science, pp. 1-11.*

(Continued)

*Primary Examiner* — Benjamin Wu
*Assistant Examiner* — Caroline H Arcos
(74) *Attorney, Agent, or Firm* — Lowenstein Sandler LLP

(57) ABSTRACT

A cloud marketplace system can be configured to communicate with multiple cloud computing environments in order to ascertain the details for the resources and services provided by the cloud computing environments for optimizing resources utilized by virtual machines. The cloud marketplace system can be configured to determine the resource and service data for the cloud computing environments and select a set of resource servers for instantiating the virtual machines based specifications of the virtual machines and parameters of the instantiation. The cloud marketplace system can be configured to periodically monitor the cloud's resources and migrate the virtual machines if resources become available that more closely match the parameters of the virtual machines.

17 Claims, 5 Drawing Sheets

(56) References Cited

U.S. PATENT DOCUMENTS

| | | | |
|---|---|---|---|
| 7,439,937 B2 | 10/2008 | Ben-Shachar et al. | |
| 7,526,515 B2 * | 4/2009 | Broussard et al. | |
| 7,529,785 B1 | 5/2009 | Spertus et al. | |
| 7,533,385 B1 * | 5/2009 | Barnes | 718/104 |
| 7,546,462 B2 | 6/2009 | Upton | |
| 7,577,722 B1 * | 8/2009 | Khandekar et al. | 709/220 |
| 7,590,623 B2 * | 9/2009 | Fellenstein et al. | |
| 7,596,620 B1 | 9/2009 | Colton et al. | |
| 7,757,214 B1 * | 7/2010 | Palczak et al. | 717/121 |
| 7,886,038 B2 * | 2/2011 | Ferris | 709/223 |
| 7,996,510 B2 * | 8/2011 | Vicente | 709/223 |
| 8,065,676 B1 * | 11/2011 | Sahai et al. | 718/1 |
| 8,112,527 B2 * | 2/2012 | Kawato | 709/226 |
| 8,230,069 B2 * | 7/2012 | Korupolu | 709/226 |
| 8,464,250 B1 * | 6/2013 | Ansel | 718/1 |
| 8,521,864 B1 * | 8/2013 | Beazer | G06F 11/3093 700/9 |
| 2001/0039497 A1 | 11/2001 | Hubbard | |
| 2002/0069276 A1 | 6/2002 | Hino et al. | |
| 2002/0165815 A1 * | 11/2002 | Vincent | 705/37 |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0088186 A1 * | 5/2004 | Anvekar et al. | 705/1 |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0050200 A1 * | 3/2005 | Mizoguchi | 709/226 |
| 2005/0131898 A1 | 6/2005 | Fatula | |
| 2005/0144060 A1 | 6/2005 | Chen et al. | |
| 2005/0160413 A1 * | 7/2005 | Broussard et al. | 717/148 |
| 2005/0182727 A1 | 8/2005 | Robert et al. | |
| 2005/0289540 A1 | 12/2005 | Nguyen et al. | |
| 2006/0059492 A1 * | 3/2006 | Fellenstein et al. | 718/104 |
| 2006/0069761 A1 * | 3/2006 | Singh et al. | 709/222 |
| 2006/0075042 A1 | 4/2006 | Wang et al. | |
| 2006/0085530 A1 * | 4/2006 | Garrett | G06F 11/3495 709/223 |
| 2006/0085824 A1 | 4/2006 | Bruck et al. | |
| 2006/0130144 A1 | 6/2006 | Wernicke | |
| 2006/0149842 A1 * | 7/2006 | Dawson et al. | 709/226 |
| 2006/0155555 A1 * | 7/2006 | Barsness et al. | 705/1 |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0106986 A1 * | 5/2007 | Worley | G06F 9/45537 718/1 |
| 2007/0226715 A1 | 9/2007 | Kimura et al. | |
| 2007/0271560 A1 * | 11/2007 | Wahlert | G06F 8/61 718/1 |
| 2007/0283282 A1 | 12/2007 | Bonfiglio et al. | |
| 2007/0294676 A1 | 12/2007 | Mellor et al. | |
| 2008/0080396 A1 * | 4/2008 | Meijer et al. | 370/254 |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0091613 A1 | 4/2008 | Gates et al. | |
| 2008/0104608 A1 | 5/2008 | Hyser et al. | |
| 2008/0201709 A1 * | 8/2008 | Hodges | 718/1 |
| 2008/0215796 A1 | 9/2008 | Lam et al. | |
| 2008/0222234 A1 * | 9/2008 | Marchand | 709/201 |
| 2008/0240150 A1 | 10/2008 | Dias et al. | |
| 2008/0244579 A1 * | 10/2008 | Muller | 718/100 |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 * | 12/2009 | Ferris | 709/235 |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 * | 12/2009 | Ferris | 718/104 |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2011/0016214 A1 | 1/2011 | Jackson | |
| 2011/0131335 A1 | 6/2011 | Spaltro et al. | |

OTHER PUBLICATIONS

Abramson et al. A computational economy for grid computing and its implementation in the Nimrod—G resource broker), 2002, Elsevier Science B.V., pp. 1061-1074.*

Buyya et al. "Economic models for management of resources in grid computing", 2002, John wiley & sons, pp. 1507-1542.*

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of

(56) References Cited

OTHER PUBLICATIONS

Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods Tracking Cloud Installation Informatin Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., rpath.com, 3 pages.
White Paper—"rPath Versus Other Software Appliance Approaches", Mar. 2008, rPath, Inc., rpath.com, 9 pages.
White Paper—"Best Practices for Building Virtual Appliances", 2008 rPath, Inc., rpath.com, 6 pages.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
Ferris, "Methods and Systems for Providing a Universal Marketplace for Resources for Delivery to a Cloud Computing Environment", U.S. Appl. No. 12/475,228, filed May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, flied Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 121627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.

(56) References Cited

OTHER PUBLICATIONS

Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

ADJUSTING RESOURCE USAGE FOR CLOUD-BASED NETWORKS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Currently, when a user desires to can lease or subscribe to the set of resources, the user may request the set of resources based on their service level requirements and then receive a price for the request. Currently, no mechanism exists for users to view different pricing information for different possible service levels. Additionally, no mechanism exist for users to view pricing information for service levels across multiple cloud computing environments. Also, no mechanism exist for users to automatically select and modify or optimize the resources utilized based on updated pricing information and updated service level information in the cloud computing environment. Thus, there is a need in the art for methods and systems that provide relevant service level and financial information and optimization services for different cloud computing environments.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
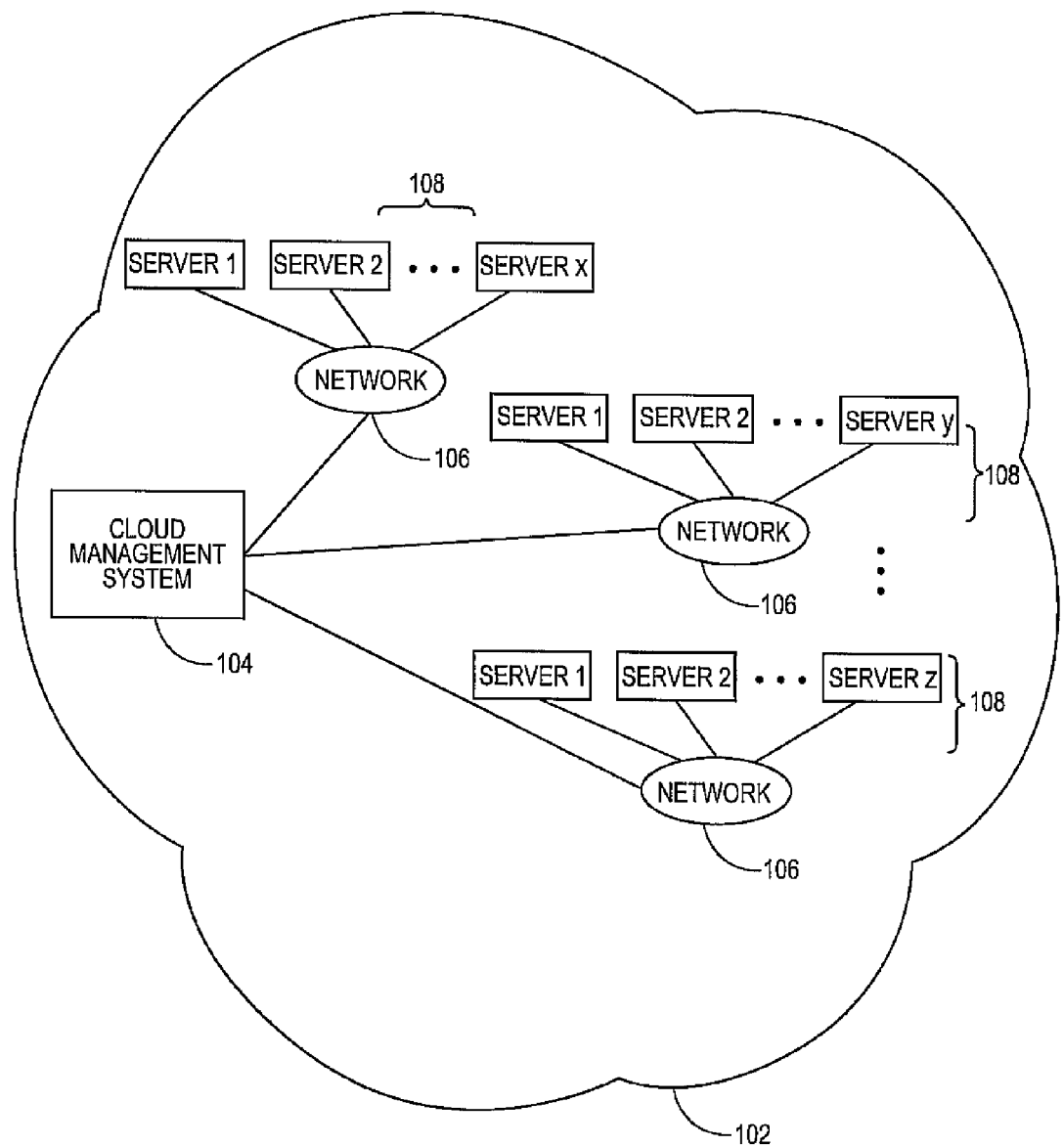
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for optimizing resource usage for cloud computing environments. More particularly, embodiments relate to platforms and techniques in which a cloud marketplace system automatically evaluates the resources and services provided by the cloud computing environments in order to instantiate virtual machines optimized according to a requester's specifications and parameters.

According to embodiments, in general, the cloud marketplace system can be configured to communicate with multiple cloud computing environments in order to ascertain the details for the resources and services provided by the cloud computing environments for optimizing resources utilized by virtual machines. In particular, an optimization engine can be configured to receive a request to instantiate virtual machines. The request can include the specifications of the virtual machines and parameters for instantiating the virtual machines such as cost, time period, and resources/services desired.

In embodiments, the optimization engine can be configured to determine the resource and service data for the cloud computing environments. The resource and service data can include computing resources and services provided by the cloud computing environments, computing resources and services available in the cloud computing environments at particular time periods, cost data for computing resources and services provided by the cloud computing environments, and status data for the cloud computing environments at particular time periods.

In embodiments, the optimization engine can be configured to select a set of resource servers for instantiating the virtual machines based on the determined resource and service data, the specifications of the virtual machines, and the parameters of the request. Once selected, the optimization engine can request instantiation of the virtual machines or directly instantiate the virtual machines.

In embodiments, the cloud marketplace system can be configured to periodically monitor the cloud's resources and migrate the virtual machines if resources become available that more closely match the parameters of the virtual machines. In particular, the optimization engine can periodically monitor and determine the service and resource data for the cloud computing environments. The optimization engine can compare the service and resource data to the original specifications and parameters of the virtual machines. If more closely matching resource servers become available, the optimization engine can migrate the virtual machines to the more closely matching resource servers.

By providing optimization for the services and resources of cloud computing environments, users can perform efficient cost-accounting for, shopping for, and migrations of existing and planned workloads to the best possible cloud computing environment. As such, the user can locate and evaluate the best priced and best quality service for their workloads and applications within minimum interaction with the clouds.

FIG. 1 illustrates an overall cloud computing environment, in systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 118 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
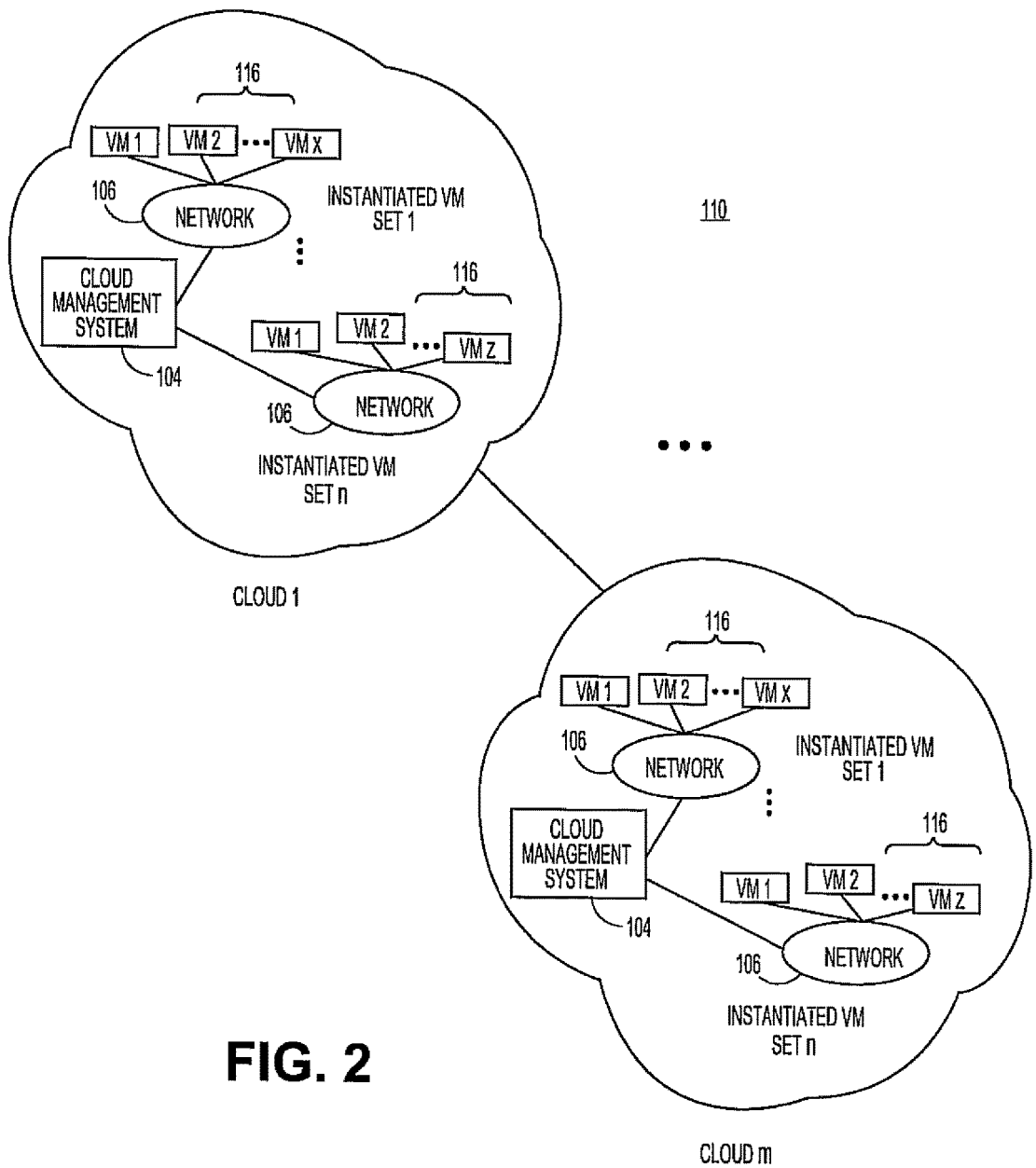
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
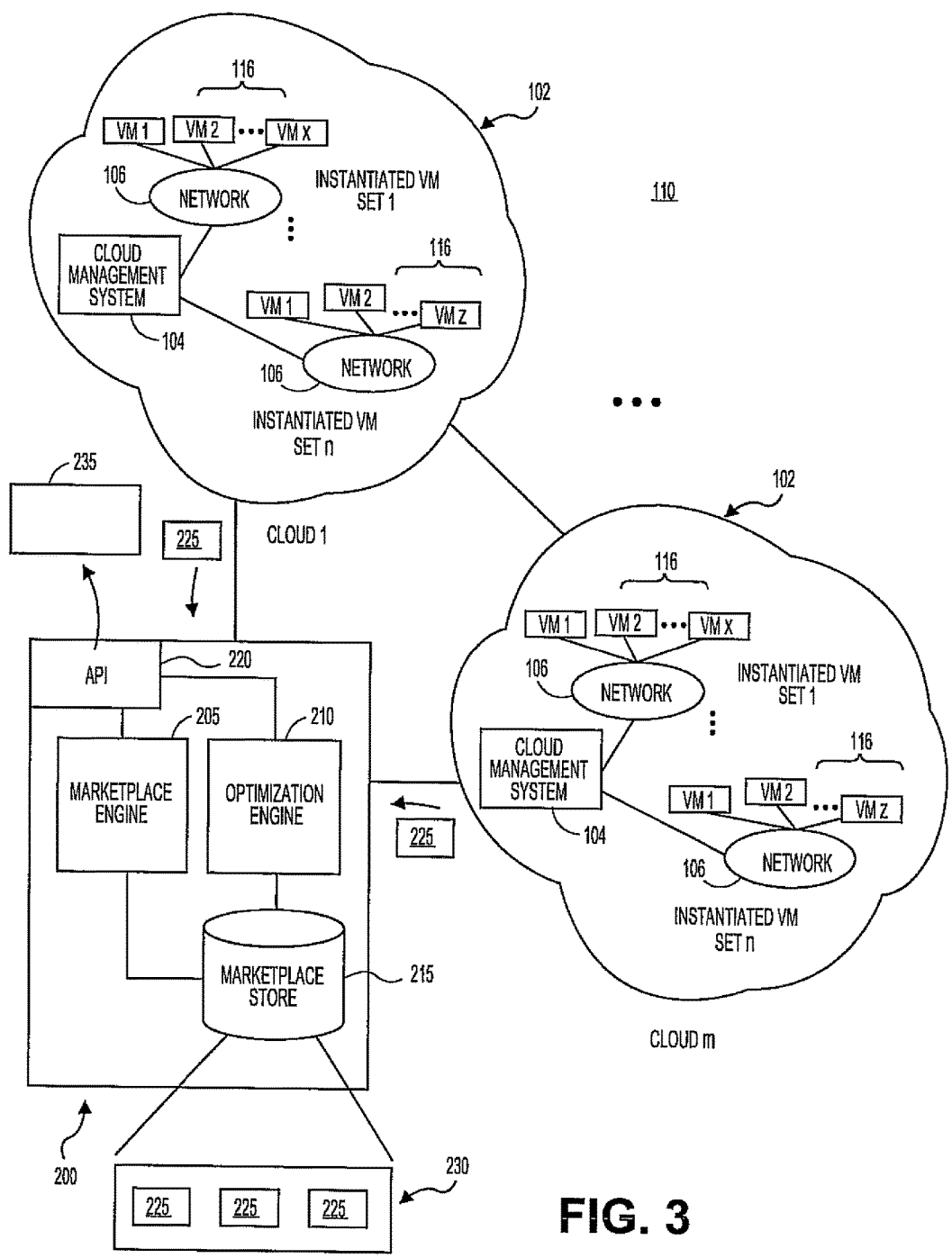
FIG. 3 illustrates a network configuration in which a marketplace system can communicate with clouds, according to various embodiments.

FIG. 3 illustrates aspects of a cloud marketplace system 200 and its interaction with various clouds 102, according to various embodiments. In embodiments, the cloud marketplace system 200 provides a marketplace for the services provided by clouds 102. In embodiments as shown, the cloud marketplace system 200 can comprise a a marketplace engine 205, an optimization engine 210, a marketplace store 215, and an application programming interface (API) 220. The marketplace engine 205 can be configured to contain control logic for performing the marketplace processes and for communicating with the clouds 102, API 220, and marketplace store 215. In embodiments as shown, the cloud marketplace system 200 provides a marketplace for the services provided by clouds 102.

In embodiments, the cloud marketplace system 200 can be configured to communicate with the clouds 102 in order to ascertain the details for the resources and services provided by the clouds 102. In particular, the cloud marketplace system 200 can be configured to retrieve, from the clouds 102, resource and service data 225 which describes the capabilities, services, status, and cost of the clouds 102. The resource and service data 225 can include data detailing computing resources and services provided by the clouds 102, computing resources and services available in the clouds 102 at particular time periods, cost for the services provided by the clouds 102, and status for the clouds 102 at particular time periods.

In embodiments, the data detailing the computing resources and services provided by the clouds 102 can include resource data specifying the sets of resources servers 108 contained in the clouds 102 and the computing resources provided by the sets of resources servers 108 (computing cycles, bandwidth, memory, storage). Additionally, the data detailing the computing resources and services provided by the clouds 102 can include service data specifying particular services provided by the clouds 102 such as identity management services, cloud management services, application and appliance building services, and the like.

In embodiments, the data detailing the computing resources and services available in the clouds 102 at particular time periods can include data specifying computing resources and services available in the clouds 102 current or at some future time. Additionally, the data detailing the computing resources and services available in the clouds 102 at particular time periods can include data specifying service level agreements for the cloud 102 for a period of time.

In embodiments, the data detailing the cost for the resources and services provided by the clouds 102 can include data such as the cost for subscription to the clouds 102, the cost for usage of the resources and services of the clouds 102, and any discounts of the costs based on the usage. For example, the cost for usage can include the cost for the resources consumed to support the virtual machines and can include the cost for the utilization of the virtual machines by the user or third parties. These can include the cost for the instantiated time of the virtual machines, the computing resource consumed by the virtual machines (computing cycles, bandwidth), the time frame of the computing resource consumption (peak time, off-peak time), and combinations thereof. The cost data can include cost data for a current time or cost data for resources and services in the future, such as total lifetime costs of a cloud application.

In embodiments, the data detailing the status for the clouds 102 at particular time periods can include data specifying the resources and services current being utilized in the clouds 102. For example, the status data can include virtual machines currently instantiated in the clouds 102 and the computing resources of the sets of resources servers 108 (computing cycles, bandwidth, memory, storage) currently utilized.

In embodiments, in order to acquire the resource and service data 225, the cloud marketplace system 200 can be configured to request the resource and service data 225 from cloud management systems 104 located in the clouds 102. Likewise, the cloud marketplace system 200 can be configured to communicate with the set of resource servers 108 directly in order to obtain the resource and service data 225. The cloud marketplace system 200 can be configured to communicate with the clouds 102 via network 106 or any other available public or private network. In particular, marketplace engine 205 can be configured to communicate with the clouds 102.

In embodiments, the cloud marketplace system 200 can be configured to maintain a repository 230 for the resource and service data 225 in order to provide the marketplace for the clouds 102. In particular, the marketplace engine 205 can be configured to maintain the repository 230. The repository 230 can be configured in any format to allow the resource and service data 225 to be stored and retrieved. For example, the repository can be configured in any type of proprietary or open-source database format. The repository 230 can include a record for each cloud 102 that includes various searchable data fields for storing the resource and service data 225 for that particular cloud.

The cloud marketplace system 200 can be configured to update the repository 230 periodically to maintain current resource and service data 225 for the clouds 102. Likewise, when providing the marketplace, the cloud marketplace system 200 can be configured to obtain the resource and service data 225, on-demand, and directly from the clouds 102.

In embodiments, to provide the marketplace, the cloud marketplace system 200 can be configured receive a request for information pertaining to the resources or services provided by or available in the clouds 102. For example, a initiator may request information on clouds 102 that can provide a certain level of computing resources at a specific cost during a specific time period. The initiator of the request the information in order to see all available resources of the clouds 102 that may meet the initiator's requirements. As such, the request can include the information regarding the resources desired by the initiator. This can include the desired computing resources, the time period for the resources, the duration of the resources, the cost of the resources, services provided by the cloud, the availability of the resources, and the like.

In particular, the marketplace engine 205 can be configured to communicate with the initiator of the request via API 220. API 220 can be configured to generate GUIs, e.g. dialog boxes, web pages, as required by marketplace engine 205 and to provide an interface for receiving requests. The initiator of the request can be a user desiring utilization of the clouds 102 or the cloud management systems 104 of the clouds 102.

Once the request is received, the cloud marketplace system 200 can be configured to search the repository 230 for resource and service data 225 relating to the request. In particular, the marketplace engine 205 can be configured to access the repository 230 stored in marketplace store 215 and search the repository 230 for resource and service data 225 matching the request. Likewise, the cloud marketplace system 200 can be configured to obtain the resource and service data 225 directly from the clouds 102.

Once located, the cloud marketplace system 200 can be configured to generate a marketplace report 235 detailing the resource and service data 225 matching the request. For example, the marketplace report 235 can include a list of clouds 102 matching the request alone with the data detailing computing resources and services provided by the matching clouds 102, computing resources and services available in the matching clouds 102 at particular time periods specified in the request, cost for the services and resources requested, and status for the matching clouds 102 at particular time periods specified in the request.

In particular, the marketplace engine 205 can be configured to extract the matching resource and service data from repository 230. Marketplace engine 205 can be configured to arrange the matching resource and service data 225 in marketplace report 235.

After generating the marketplace report 235, the cloud marketplace system 200 can be configured to provide the marketplace report 235 to the initiator of the request. In particular, the marketplace engine 205 can be configured to provide the marketplace report 235 via API 220.

Once the report is received, the initiator or the user can make a determination on which resources of the clouds 102 to utilize. This can include utilizing resources from a single cloud 102 or resources from multiple clouds 102. For example, the initiator can select one or more cloud 102 with which to instantiate a virtual machine or machines. The initiator can make a request for the resources directly to the clouds 102. Likewise, the cloud marketplace system 200 can be configured to receive the initiators requests for resources and forward the request to the clouds 102, or reserve the resources directly.

In additional embodiments, the cloud marketplace system 200 can be configured to utilize the resource and service data 225 to provide automatic and optimized initiation and migration services for virtual machines initiated in the clouds 102. In particular, the optimization engine 210 can be configured to contain control logic for performing the initiation and migration processes and for communicating with the clouds 102, the marketplace engine 205, API 220, and the marketplace store 215.

In embodiments, for a particular virtual machine or machines to be instantiated in the cloud 102, the cloud marketplace system 200 can be configured to receive a request to instantiate virtual machines in the clouds 102. The request can include specifications of the virtual machines or copies of the virtual machines. The request can also include parameters for instantiating the virtual machines, such as desired cost for instantiating the virtual machine, time period for instantiation of the virtual machine, desired resources for the virtual machine (computing cycles, bandwidth, etc), and the like.

In embodiments, once the request is received, the optimization engine 210 can be configured to determine a set of resource servers from clouds 102 on which to instantiate the virtual machines according to the request. In particular, the optimization engine 210 can be configured to determine a set of resource servers that most closely match the specifications for the virtual machines and the parameters specified by the requester. For example, a requester can request that virtual machines be instantiated in order to minimize cost and, in response, the optimization engine 210 can determine a set of resources servers that meet the specifications of the virtual machines while minimizing the cost of instantiating and supporting the virtual machines.

In embodiments, in order to determine a set of resources servers, the optimization engine 210 can be configure to determine resource and service data 225 for cloud 102. The optimization engine 210 can be configured to request resource and service data 225 from marketplace engine 205. Additionally, the optimization engine 210 can be configured to retrieve stored resource and service data 225 from marketplace store 215. Also, the optimization engine 210 can be configured to include the logic of the marketplace engine 205 in order to determine resource and service data 225 directly from the clouds 102. As mentioned above, the resource and service data 225 can describe the capabilities, services, status, and cost of the clouds 102. The resource and service data 225 can include data detailing computing resources and services provided by the clouds 102, computing resources and services available in the clouds 102 at particular time periods, cost for the services provided by the clouds 102, and status for the clouds 102 at particular time periods.

Once the resource and service data 225 is determined, the optimization engine 210 can be configured to select a set of resource servers from clouds 102 that most closely match the specifications and parameters of the request. The optimization engine 210 can compare the specifications and parameters to resources and services data 225 in order to select a set of resource servers that most closely match the request. The optimization engine 210 can select the set of resource servers for the overall virtual machines. Likewise, the optimization engine 210 can select the set of resource servers that most closely match the request based on each component of the virtual machines. That is, the optimization engine 210 can compare the specifications and parameters for each component of the virtual machines to resources and services data 225 in order to select a set of resource servers for each component.

In embodiments, once the set of resource servers are selected, optimization engine 210 can be configured to send a request to the clouds 102 to initiate the virtual machines. Additionally, the optimization engine 210 can be configured to directly instantiate the virtual machines in the clouds 102.

In embodiments, for a particular virtual machine or machines instantiated in the clouds 102, the cloud marketplace system 200 can be configured to periodically monitor the clouds 102 for resources that more closely match the specification and parameters of virtual machines and migrate the virtual machines if more closely matched resources become available. In particular, the optimization engine 210 can be configured to periodically monitor resource and service data 225 and compare resources and service data 225 to the specification and parameters of the virtual machines. If a more closely matched set of resource servers become available, the optimization engine 210 can be configured to migrate the virtual machines to the more closely matched set of resource servers in clouds 102. The optimization engine 210 can be configured to migrate the entire virtual machines or portions of the virtual machines.

To migrate the virtual machine or machines, the optimization engine 210 can be configured send a request, to the clouds 102 currently instantiating the virtual machine or machines, to migrate the virtual machine or machines to a new set of resource servers. The request can include an identification of the virtual machine or machines and an identification of the new set of resource servers. Likewise, the optimization engine 210 can be configured to retrieve the virtual machine or machines from the clouds 102 currently instantiating the virtual machine or machines and pass the virtual machine or machines to the new set of resource servers.

Prior to migrating, the cloud marketplace system 200 can be configured to notify the user or initiator of the possible migration and allow the initiator to approve or decline the migration. Likewise, the cloud marketplace system 200 can be configured to migrate the virtual machines automatically and transparent to the user or initiator. Once migrated, cloud marketplace system 200 can be configured to notify the user or initiator of the migration. For notification, the optimization engine 210 can be configured to notify the user or initiator via API 220.

In embodiments, once virtual machines are instantiated, the cloud marketplace system 200 can be configured to receive updated parameters for the instantiated virtual machines. For example, a requester can send a request to change the virtual machines from being optimized for cost to being optimized for a particular resource or service level. As such, the optimization engine 210 can be configured to determine the resource and service data 225, as described above, and compare resources and service data 225 to the new parameters of the virtual machines. If a more closely matched set of resource servers are available, the optimization engine 210 can be configured to migrate the virtual machines to the more closely matched set of resource servers in the clouds 102, as described above.

Figure 4:
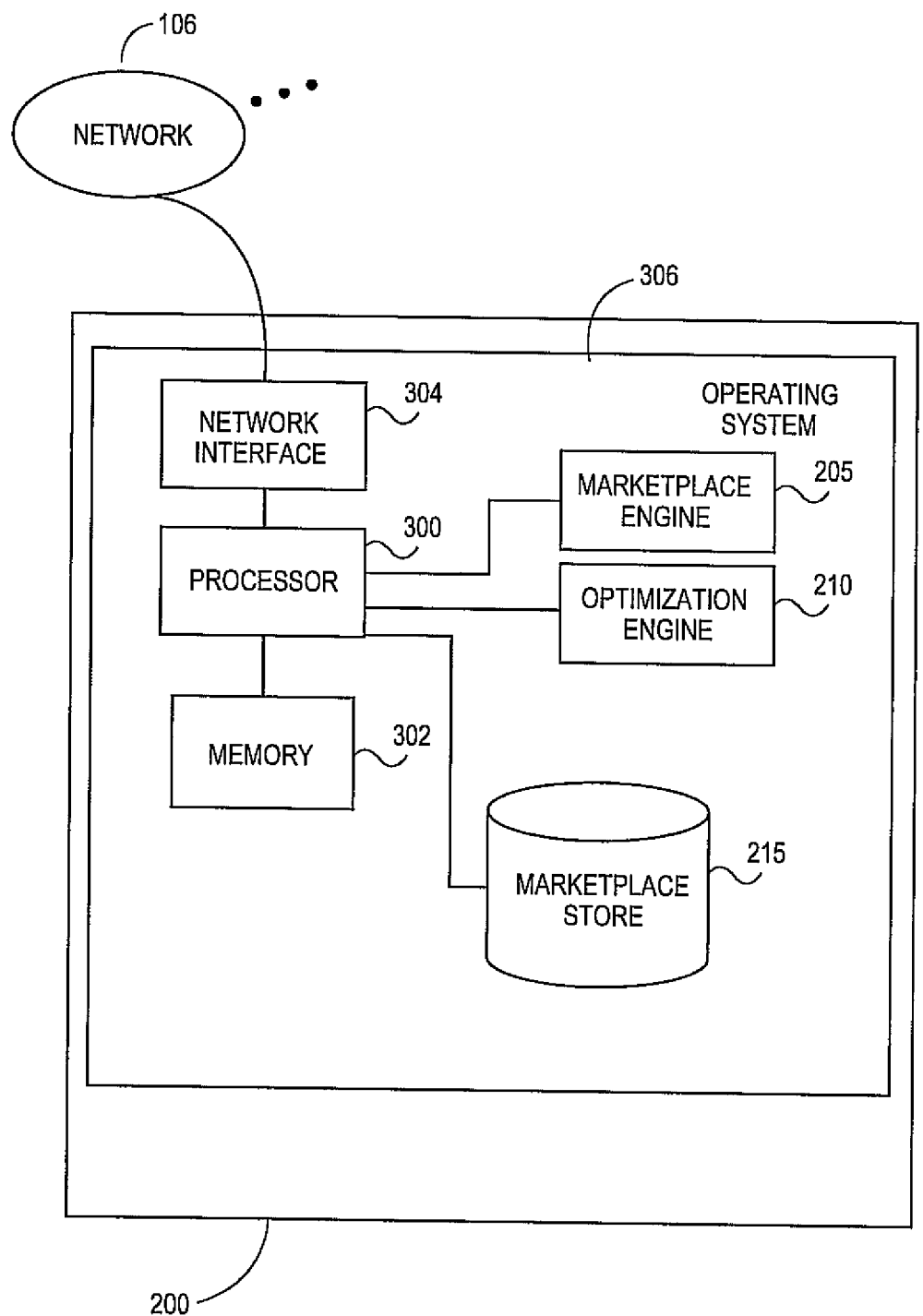
FIG. 4 illustrates an exemplary hardware configuration for a marketplace system, according to various embodiments.

FIG. 4 illustrates an exemplary diagram of hardware and other resources that can be incorporated in a cloud marketplace system 200 configured to communicate with instantiated the clouds 102 and users or initiators via one or more networks 106, according to embodiments. In embodiments as shown, the cloud marketplace system 200 can comprise a processor 300 communicating with memory 302, such as electronic random access memory, operating under control of or in conjunction with operating system 306. Operating system 306 can be, for example, a distribution of the Linux™ operating system, the Unix™ operating system, or other open-source or proprietary operating system or platform. Processor 300 also communicates with the marketplace store 215, such as a database stored on a local hard drive. Processor 300 further communicates with network interface 304, such as an Ethernet or wireless data connection, which in turn communicates with one or more networks 106, such as the Internet or other public or private networks. Processor 300 also communicates with marketplace store 215 and the marketplace engine 205, to execute control logic and perform the marketplace process described above. Additionally, processor 300 also communicates with marketplace store 215 and the optimization engine 210, to execute control logic and perform the migration process described above. Other configurations of the cloud marketplace system 200, associated network connections, and other hardware and software resources are possible.

While FIG. 4 illustrates the cloud marketplace system 200 as a standalone system comprises a combination of hardware and software, the cloud marketplace system 200 can also be implemented as a software application or program capable of being executed by a convention computer platform. Likewise, the cloud marketplace system 200 can also be implemented as a software module or program module capable of being incorporated in other software applications and programs. In either case, the cloud marketplace system 200 can be implemented in any type of conventional proprietary or open-source computer language.

Additionally, as illustrated in FIG. 4, the cloud marketplace system 200 can be a standalone system capable of being access by or controlled by a user or initiator of the marketplace, optimization, and migration processes. Likewise, the cloud marketplace system 200 can be integrated into one or more of the clouds 102. Additionally, the cloud marketplace system 200 can be integrated into one or more of the systems of the clouds 102 such as the cloud management systems.

Figure 5:
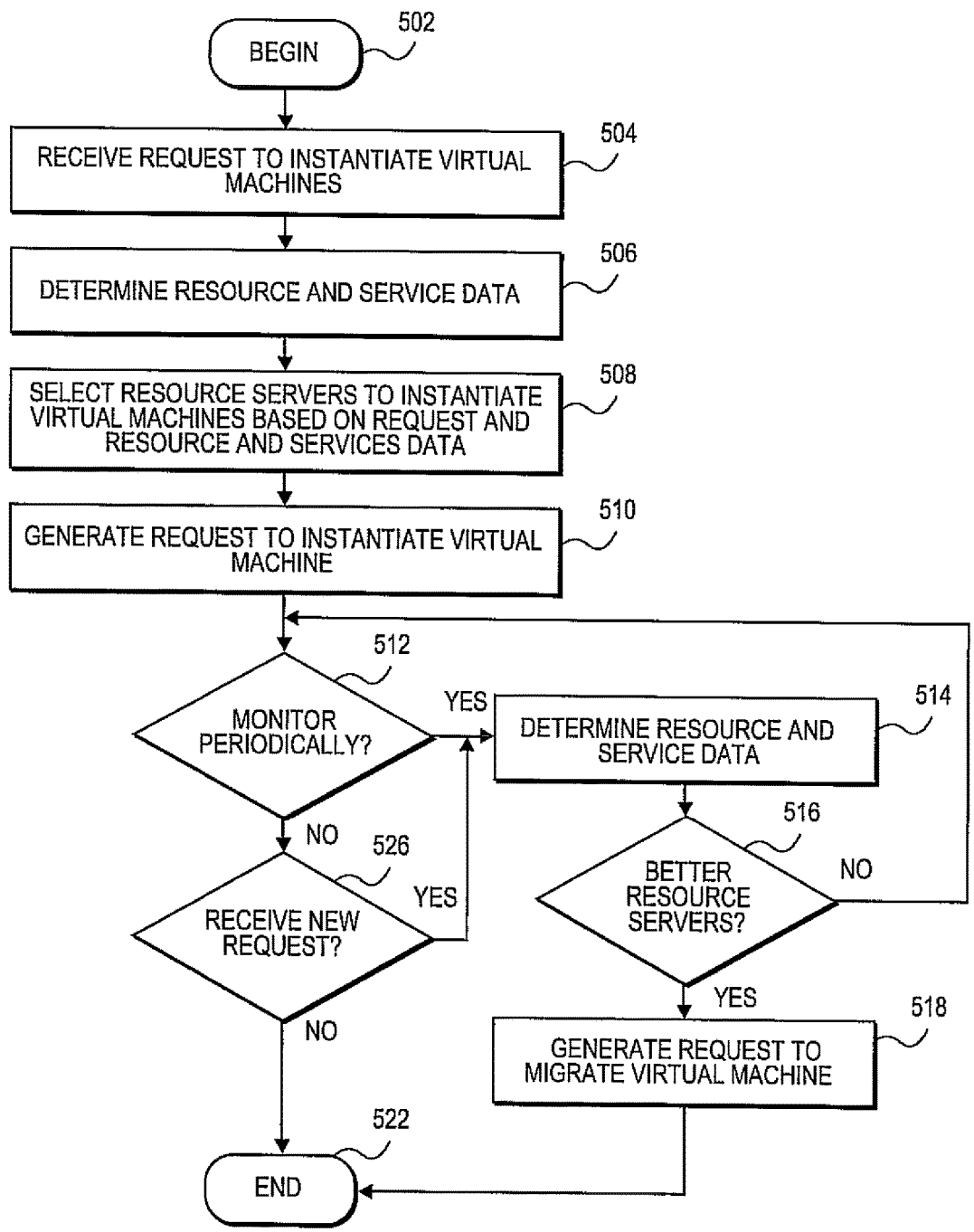
FIG. 5 illustrates a flowchart for resource optimization in a cloud computing environment, according to various embodiments.

FIG. 5 illustrates a flow diagram of overall optimization and migration processes in a cloud marketplace system 200, according to embodiments of the present teachings. In 502, processing can begin. In 504, the optimization engine 210 can receive a request to instantiate virtual machines in the clouds 102. In 506, the optimization engine 210 can determine the resource and service data 225 which describes the capabilities, services, status, and cost of the clouds 102. The resource and service data can include computing resources and services provided by the clouds 102, computing resources and services available in the clouds 102 at particular time periods, cost data for computing resources and services provided by the clouds 102, and status data for the clouds 102 at particular time periods.

In order to acquire the resource and service data, the optimization engine 210 can request the resource and service data from marketplace engine 205 or marketplace store 215. Likewise, the optimization engine 210 can communicate with the resources of the clouds 102 directly in order to obtain the resource and service data.

In 508, the optimization engine 210 can select a set of resource servers that match the request based on the resource and service data 225. In 510, the optimization engine 210 can generate a request to instantiate the virtual machines on the selected set of resource servers.

In 512, the optimization engine 210 can periodically monitor resource and services data 225 for the clouds 102.

In 514, the optimization engine 210 can periodically determine the resource and service data 225. In 516, the optimization engine 210 can determine if an additional set of resource servers exits that more closely match the original request. If an additional set of resource servers exits, in 518, the optimization engine 210 can migrate the virtual machines to the additional set of resource servers. Otherwise, the optimization engine 210 can continue to monitor the resource and service data 225 for better matching resource servers.

In 520, optimization engine 210 can receive a request to optimize the virtual machines based on a new parameter. If the request is received, the optimization engine 210 can determine if an additional set of resource servers exits that match the new request. If an additional set of resource servers exits, the optimization engine 210 can migrate the virtual machines to the additional set of resource servers.

Then, in 522, the process can end, but the process can return to any point and repeat.

In the foregoing and other embodiments, the user or initiator making an request for marketplace processes or migration processes can be a person, customer, subscriber, corporation, organization, or other entity. In embodiments, the user can be or include another virtual machine, application or process. In further embodiments, multiple users or entities can share the use of a set of virtual machines or other resources.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   receiving, by a processor, a first request to instantiate a virtual machine, wherein the first request comprises: a specification of the virtual machine indicating a configuration for the virtual machine, one or more parameters indicating constraints for instantiating the virtual machine in a cloud computing environment, and a period of time for which the virtual machine is to be used;
   determining, by the processor, an availability of a plurality of servers provided by the cloud computing environment within the period of time defined in the first request;
   selecting, by the processor, in view of the availability, the specification, and the one or more parameters, a first set of servers from the plurality of servers to instantiate the virtual machine within the period of time defined in the first request, wherein at least one resource provided by the first set of servers does not match the one or more parameters defined in the first request;
   generating, by the processor, a second request to instantiate the virtual machine on the first set of servers;
   instantiating the virtual machine on the first set of servers based on the specification;
   periodically monitoring the cloud computing environment for an availability within the period of time defined in the first request of a second set of servers from the plurality of servers with at least one resource that at least partially matches the specification and the one or more parameters for instantiating the virtual machine;
   determining that the second set of servers with at least one resource that at least partially matches the specification and the one or more parameters is available for instantiating the virtual machine within the period of time defined in the first request;
   determining a first matching level of the first set of servers, wherein the first matching level is a degree to which the at least one resource provided by the first set of servers matches the specification and the one or more parameters defined in the first request;
   determining a second matching level of the second set of servers, wherein the second matching level is a degree to which the at least one resource provided by the second set of servers matches the specification and the one or more parameters defined in the first request;
   comparing the first matching level and the second matching level; and
   migrating the virtual machine to the second set of servers within the period of time defined in the first request when the second matching level is greater than the first matching level to adjust usage of one or more resources in the cloud computing environment.

2. The method of claim 1, wherein the determining the availability of the plurality of servers comprises consulting a repository.

3. The method of claim 1, wherein the first request is from a cloud management system that manages the cloud computing environment.

4. The method of claim 1, wherein the availability of the plurality of servers is determined in view of resource and service data comprising at least one of:
   a computing resource and the service provided by the cloud computing environment,
   a computing resource and the service available in the cloud computing environment at a particular time period,
   cost data for a computing resource and the service provided by the cloud computing environment, or
   status data for the cloud computing environment at the particular time period.

5. The method of claim 4, further comprising:
   receiving one or more additional parameters for the virtual machine; and
   selecting an additional set of servers from the cloud computing environment to migrate the virtual machine to in view of the resource and service data, the specification of the virtual machine, and the one or more additional parameters.

6. The method of claim 1, wherein the one or more parameters further comprises at least one of a cost of a resource of the one or more resources in the cloud computing environment or a service level of a resource in the cloud computing environment.

7. The method of claim 1, further comprising:
   receiving, by the processor, a third request to change the one or more parameters from a cost of resources of the second set of servers in the cloud computing environment to a service level of resources of the second set of servers in the cloud computing environment;
   updating the one or more parameters for the virtual machine to obtain one or more updated parameters; and
   monitoring the cloud computing environment for an availability of the second set of servers with the resources that matches the one or more updated parameters.

8. A system comprising:
a network interface; and
a processor, operatively coupled with the network interface, to:
receive, via the network interface, a first request to instantiate a virtual machine, wherein the first request comprises: a specification of the virtual machine indicating a configuration for the virtual machine, one or more parameters indicating constraints for instantiating the virtual machine in a cloud computing environment, and a period of time for which the virtual machine is to be used;
determine an availability of a plurality of servers provided by the cloud computing environment within the period of time defined in the first request;
select, in view of the availability, the specification, and the one or more parameters, a first set of servers from the plurality of servers to instantiate the virtual machine within the period of time defined in the first request, wherein at least one resource provided by the first set of servers does not match the one or more parameters defined in the first request;
generate a second request to instantiate the virtual machine on the first set of servers;
instantiate the virtual machine on the first set of servers based on the specification;
periodically monitoring the cloud computing environment for an availability within the period of time defined in the first request of a second set of servers from the plurality of servers with at least one resource that at least partially matches the specification and the one or more parameters for instantiating the virtual machine;
determining that the second set of servers with at least one resource that at least partially matches the specification and the one or more parameters is available for instantiating the virtual machine within the period of time defined in the first request;
determine a first matching level of the first set of servers, wherein the first matching level is a degree to which the at least one resource provided by the first set of servers matches the specification and the one or more parameters defined in the first request;
determine a second matching level of the second set of servers, wherein the second matching level is a degree to which the at least one resource provided by the second set of servers matches the specification and the one or more parameters defined in the first request;
compare the first matching level and the second matching level; and
migrate the virtual machine to the second set of servers within the period of time defined in the first request when the second matching level is greater than the first matching level to adjust usage of one or more resources in the cloud computing environment.

9. The system of claim 8, wherein the determining of the availability of the plurality of servers comprises consulting a repository.

10. The system of claim 8, wherein the first request is from a cloud management system that manages the cloud computing environment.

11. The system of claim 8, wherein the availability of the plurality of servers is determined in view of resource and service data comprising at least one of:
a computing resource and the service provided by the cloud computing environment,
a computing resource and the service available in the cloud computing environment at a particular time period,
cost data a computing resource and the service provided by the cloud computing environment, or
status data for the cloud computing environment at the particular time period.

12. The system of claim 11, wherein the processor is further to:
receive one or more additional parameters for the virtual machine; and
select an additional set of servers from the cloud computing environment to migrate the virtual machine to in view of the resource and service data, the specification of the virtual machine, and the one or more additional parameters.

13. The system of claim 8, wherein the one or more parameters further comprises at least one of a cost of a resource in the cloud computing environment or a service level of a resource of the one or more resources in the cloud computing environment.

14. The system of claim 8, wherein the processor is further to:
receive, by the processor, a third request to change the one or more parameters from a cost of resources of the second set of servers in the cloud computing environment to a service level of resources of the second set of servers in the cloud computing environment;
update, by the processor, the one or more parameters for the virtual machine to obtain one or more updated parameters; and
monitor, by the processor, the cloud computing environment for an availability of the second set of servers with the resources that matches the one or more updated parameters.

15. A non-transitory computer readable medium comprising executable instructions that, when executed by a processor, cause the processor to:
receive, by the processor, a first request to instantiate a virtual machine, wherein the first request comprises: a specification of the virtual machine indicating a configuration for the virtual machine, one or more parameters indicating constraints for instantiating the virtual machine in a cloud computing environment, and a period of time for which the virtual machine is to be used;
determine, by the processor, an availability of a plurality of servers provided by the cloud computing environment within the period of time defined in the first request;
select, by the processor, in view of the availability, the specification, and the one or more parameters, a first set of servers from the plurality of servers to instantiate the virtual machine within the period of time defined in the first request, wherein at least one resource provided by the first set of servers does not match the one or more parameters defined in the first request;
generate, by the processor, a second request to instantiate the virtual machine on the first set of servers;
instantiate the virtual machine on the first set of servers based on the specification;
periodically monitor the cloud computing environment for an availability within the period of time defined in the first request of a second set of servers from the plurality of servers with at least one resource that at least partially matches the specification and the one or more parameters for instantiating the virtual machine;

determine, by the processor, that the second set of servers with at least one resource that at least partially matches the specification and the one or more parameters is available for instantiating the virtual machine;

determine, by the processor, a first matching level of the first set of servers, wherein the first matching level is a degree to which the at least one resource provided by the first set of servers matches the specification and the one or more parameters defined in the first request;

determine, by the processor, a second matching level of the second set of servers, wherein the second matching level is a degree to which the at least one resource provided by the second set of servers matches the specification and the one or more parameters defined in the first request;

compare, by the processor, the first matching level and the second matching level; and migrate, by the processor, the virtual machine to the second set of servers within the period of time defined in the first request when the second matching level is greater than the first matching level to adjust usage of one or more resources in the cloud computing environment.

16. The non-transitory computer readable medium of claim 15, wherein the processor further to:

receive one or more additional parameters for the virtual machine; and select an additional set of servers from the cloud computing environment to migrate the virtual machine to in view of the resource and service data, the specification of the virtual machine, and the one or more additional parameters.

17. The non-transitory computer readable medium of claim 15, wherein the processor further to:

receive, by the processor, a third request to change the one or more parameters from a cost of resources of the second set of servers in the cloud computing environment to a service level of resources of the second set of servers in the cloud computing environment;

update, by the processor, the one or more parameters for the virtual machine to obtain one or more updated parameters; and monitor, by the processor, the cloud computing environment for an availability of the second set of servers with the resources that matches the one or more updated parameters.

* * * * *